United States Patent [19]

Izumi et al.

[11] Patent Number: 5,702,505
[45] Date of Patent: Dec. 30, 1997

[54] METHOD FOR COLLECTING VOLATILE ORGANIC SUBSTANCES

[75] Inventors: Jun Izumi; Akinori Yasutake; Hiroyuki Tsutaya, all of Nagasaki; Takayuki Harada; Kenichi Hamada, both of Shimonoseki, all of Japan

[73] Assignee: Mitsubishi Jukogyo Kabushiki Kaisha, Tokyo, Japan

[21] Appl. No.: 646,488

[22] Filed: May 8, 1996

[30] Foreign Application Priority Data

May 10, 1995 [JP] Japan ................... 7-112056

[51] Int. Cl.$^6$ .................. B01D 53/04; B01D 53/26
[52] U.S. Cl. .................. 95/115; 95/113; 95/123; 95/125; 95/143; 95/144; 95/147
[58] Field of Search .................. 95/41, 96, 113, 95/115, 117–126, 143, 144, 147

[56] References Cited

U.S. PATENT DOCUMENTS

| | | | |
|---|---|---|---|
| 3,080,692 | 3/1963 | Staley et al. | 95/113 X |
| 3,719,026 | 3/1973 | Sand | 95/143 X |
| 3,732,326 | 5/1973 | Chen | 95/143 X |
| 4,153,428 | 5/1979 | Saunders et al. | 95/125 X |
| 4,409,006 | 10/1983 | Mattia | 95/113 |
| 4,455,444 | 6/1984 | Kulprathipanja et al. | 95/143 X |
| 4,480,393 | 11/1984 | Flink et al. | 95/122 X |
| 4,846,852 | 7/1989 | Schweitzer et al. | 95/125 |
| 5,220,796 | 6/1993 | Kearns | 95/123 X |
| 5,221,520 | 6/1993 | Cornwell | 95/117 X |
| 5,346,535 | 9/1994 | Kuznicki et al. | 95/96 |
| 5,389,125 | 2/1995 | Thayer et al. | 95/115 X |
| 5,417,742 | 5/1995 | Tamhankar et al. | 95/96 |
| 5,425,242 | 6/1995 | Dunne et al. | 95/119 X |
| 5,512,083 | 4/1996 | Dunne | 95/113 |
| 5,536,301 | 7/1996 | Lansbarkis et al. | 95/117 |

FOREIGN PATENT DOCUMENTS

| | | |
|---|---|---|
| 0 215 472 | 3/1987 | European Pat. Off. . |
| 3-135410 | 6/1991 | Japan ................... 95/96 |
| WO88/06481 | 9/1988 | WIPO ................... 95/117 |

OTHER PUBLICATIONS

Patent Abstracts of Japan, vol. 015, No. 445, (C–0884), Nov. 13, 1991 & JP-A-03 188916 (Kobe Steel Ltd), Aug. 16, 1991 (Abstract & Figure).

*Gas Separation by Adsorption Processes*, Ralph T. Yang, Butterworth Publishers, Stoneham, MA (1987), pp. 237-239.

Patent Abstracts of Japan, vol. 018, No. 301 (C–1210), Jun. 9, 1994 & JP-A-06 063350 (Ebara Corp), Mar. 8, 1994 (abstract).

Patent Abstracts of Japan, vol. 017, No. 285 (C–1066), Jun. 2, 1993 & JP-A-05 015725 (Kobe Steel Ltd), Jan. 26, 1993 (abstract).

*Primary Examiner*—Robert Spitzer
*Attorney, Agent, or Firm*—Wenderoth, Lind & Ponack

[57] ABSTRACT

A method for collecting volatile organic substances from an off-gas containing moisture and volatile organic substances. The organic substances are removed from the gas containing the organic substances and the moisture by introducing the gas into an adsorbing tower filled with the adsorbents and being in the adsorbing process under a relatively low temperature condition. The gas is discharged outside the system as the gas containing the moisture but from which the organic substances have been removed. The organic substances are desorbed under a relatively high temperature condition in the regenerating process for the regeneration. The moisture is removed from the desorbed gas discharged from the adsorbent regenerating process in a dehumidifying tower filled with the moisture absorbent by the temperature swing method or pressure swing method. The obtained dry gas containing a high concentration of organic substances is introduced into a liquefier to be cooled and/or pressurized and to be liquefied so that the organic substances are collected. It is therefore possible to collect the organic substances at a high concentration magnification rate without degrading the organic substances and the adsorbents.

6 Claims, 2 Drawing Sheets

METHOD FOR COLLECTING VOLATILE ORGANIC SUBSTANCES

BACKGROUND OF THE INVENTION

The present invention relates to a method for collecting volatile organic substances from off-gas containing moisture and volatile organic substances.

Volatile organic substances such as acetone, toluene, methyl ethyl ketone (MEK), ethyl alcohol, isopropyl alcohol, cyclohexanone (hereinafter simply referred to as organic substances) have been widely used in various plants in the chemical, electronic and mechanical industries and the like. Discharge of the off-gas containing the organic substances from these plants without any treatment is severly regulated in view of environmental protection. For this reason, there have been proposed various methods of treatment which have actually been into practice. Above all of these treatments, the most typical method, i.e., an activated carbon adsorption-steam regenerating method will be explained as follows. The off-gas containing the organic substances is introduced at room temperature into an adsorbing tower, which has been filled with the activated carbon, to remove the organic substances, and then the resulting non-harmful off-gas is discharged to the atmosphere. The organic substances adsorbed on the activated carbon are desorbed by steam at a high temperature. The steam containing the organic substances is condensed. The water phase and the organic phase are separated for collecting the organic substances.

In this method, since the activated carbon is a hydrophobic adsorbent, the adsorbed organic substances are effectively desorbed due to the flow of the steam, and the reoperation in the drying step and the adsorbing step subsequent to the steps of drying and cooling the activated carbon is effectively carried out. Also, the separation of the organic substances and the steam is generally easy to conduct through a low temperature condensation of the steam. For this reason, this method has been extensively used. However, as a problem to be solved, since the steam is used for regenerating the adsorbent, the organic substances would be subjected to thermal decomposition due to the catalytic effect of the activated carbon at a high temperature, so that it would be difficult to reuse the organic substances. Otherwise, part of the organic substances remain on the activated carbon to deteriorate the adsorbing property. Also, there is a fear that, in the process for collecting the organic substances from the condensed water by condensing the steam containing the organic substances, part of the organic substances would be dissolved in the condensed water to cause secondary contamination such as water pollution.

On the other hand, another method has been proposed as follows. Hydrophobic zeolite having a high $SiO_2/Al_2O_3$ ratio is used as the adsorbent to adsorb the organic substances at room temperature, and then the resulting non-harmful off-gas is discharged from the system. The adsorbed organic substances are desorbed at a high temperature while introducing the air kept at a high temperature into the adsorbing tower. The collected organic substances are introduced into a catalytic combustion unit to be burnt and collected as a heat quantity. In this method, since the high temperature air is used as a regeneration gas, the problem of the secondary contamination such as the water pollution due to the dissolution of the organic substances to the condensed water of the steam might be overcome. However, due to the regeneration through the high temperature air, it would be difficult to collect and reuse the thermally unstable organic substances such as cyclohexanone, MEK. After all, the solvent or the like (volatile organic substances) which has been collected is used as fuel. In view of resource saving, needless to say, it is inherently desirable to collect and reuse the organic substances.

The above-described method for collecting the organic substances by the adsorbent suffers from a problem that the adsorbed organic substances are desorbed by air or steam at high temperature so that the organic substances are subjected to the thermal decomposition to degrade the quality of the collected organic substances. Also, this regeneration method by the steam suffers from secondary contamination such as water pollution due to the dissolution of the organic substances in the condensed water.

SUMMARY OF THE INVENTION

In view of the foregoing defects inherent in the prior art, an object of the present invention is to provide an organic substances collecting method for selectively collecting only organic substances from gas (off-gas) containing organic substances and moisture, The method according to the present invention includes the followings:

(1) A method for collecting the volatile organic substances by processing gas containing volatile organic substances and moisture with adsorbent and moisture absorbent, comprising the following steps of:
  introducing the gas containing the volatile organic substances and the moisture into an adsorbing tower filled with the adsorbents for selectively adsorbing the volatile organic substances and being in an adsorbing process under a relatively low temperature condition to remove the volatile organic substances from the gas containing the volatile organic substances and moisture, and discharging the gas as moisture containing gas from which the volatile organic substances are removed outside of the system;
  desorbing and regenerating the adsorbents which have adsorbed the volatile organic substances by a purge gas under a relatively high temperature condition in a regenerating process;
  introducing the desorbed gas containing the volatile organic substances at a high concentration discharged from the adsorbent regenerating process into a dehumidifying tower filled with the moisture absorbent for selectively adsorbing the moisture and being in the adsorbing process under a relatively low temperature condition and removing the moisture therefrom;
  regenerating the moisture absorbent that has adsorbed the moisture by desorbing the moisture by the purge gas under a relatively high temperature condition in a regenerating process; and
  introducing the dry gas containing a high concentration of volatile organic substances discharged from the adsorbing process in said dehumidifying tower into a liquefier, cooling and/or pressurizing the dry gas to be liquefied to collect the volatile organic substances.

(2) A method for collecting the volatile organic substances by processing gas containing volatile organic substances and moisture with a moisture absorbent and another comprising the following steps of:
  introducing the gas containing the volatile organic substances and the moisture into an adsorbing tower filled with the said another absorbent for selectively adsorbing the volatile organic substances and being in the adsorbing process under a relatively low temperature condition to remove the volatile organic substances therefrom, and discharging the gas outside the system as a moisture containing gas from which the volatile organic substances are removed;

desorbing and regenerating said another adsorbent that has adsorbed the volatile organic substances by a purge gas under a relatively high temperature condition in a regenerating process;

introducing a desorbed gas containing the volatile organic substances at a high concentration discharged from the adsorbent regenerating process into a dehumidifying tower filled with the adsorbent for selectively adsorbing the moisture and being in the adsorbing process under a relatively high pressure condition and removing the moisture therefrom;

regenerating the moisture absorbent that has adsorbed the moisture by desorbing the moisture by the purge gas under a relatively low pressure condition in a regenerating process; and introducing a dry gas containing a high concentration of volatile organic substances discharged from the adsorbing process in said dehumidifying tower into a liquefier, cooling and/or pressurizing the dry gas to be liquefied to collect the volatile organic substances.

(3) The method for collecting the volatile organic substances according to the method (1) or (2), characterized in that, in said volatile organic substances adsorbing tower, an outlet gas from the adsorbing process of said volatile organic substances adsorbing tower is used as the purge gas for the regeneration of the adsorbents that have adsorbed the volatile organic substances.

(4) The method for collecting the volatile organic substances according to any one of the methods (1) to (3), characterized in that the outlet gas from the adsorbing process of said dehumidifying tower is used as the purge gas for the regeneration of the adsorbents that have adsorbed the moisture.

The present inventors have found out that the thermal decomposition of the organic substances is strongly affected by the $SiO_2/Al_2O_3$ ratio of zeolite used as adsorbent while studying a method for avoiding the thermal decomposition of the organic substances in the organic substances collecting process. Accordingly, zeolites such as USY (Ultra Stable Y-type Zeolite, Trade Name made by PQ CORP.: $SiO_2/Al_2O_3$ ratio of 70) having a high $SiO_2/Al_2O_3$ ratio and ZSM-5 (made by Mobil Oil Co., Trade Name, $SiO_2/Al_2O_3$ ratio of 400), silicalite are used as the adsorbent to avoid the thermal decomposition of the organic substances which are unstable at a high temperature, such as methyl ethyl ketone (MEK) and cyclohexanone.

Also, normally, the off-gas contains the moisture of about 0.5 to 3 vol %. However, since the adsorbent having a high $SiO_2/Al_2O_3$ ratio exhibits the organic substances selectivity (hydrophobic property) to the gas containing the organic substances and the moisture, it is possible to selectively adsorb the organic substances without containing a large amount of moisture. However, since the desorbed gas from which the organic substances that have been thus adsorbed are desorbed generally contain the moisture of about 1%, the liquefaction temperature could not be kept below 0° C. due to the freezing problem, and its efficiency for collecting the organic substances is low.

In the method according to the present invention, the moisture is removed from the above-described desorbed gas in the dehumidifying tower filled with the moisture absorbent that selectively adsorbs the moisture, by a temperature swing method or a pressure swing method, so that the liquefaction below 0° C. become possible thereby enabling very effective liquefaction and collection of the organic substances. The adsorbed moisture is desorbed from the moisture absorbent as steam in the regenerating process. Accordingly, by returning this to the inlet of the adsorbing process in the organic substances adsorbing tower, almost all the moisture is discharged to the outside of the system from the outlet of the adsorbing tower.

Incidentally, as a method for liquefying the organic substances from the high concentration organic substances containing gas from which the moisture has been removed in the dehumidifying tower and for collecting the organic substances, it is possible to use, in addition to the cooling method, a method using both the cooling operation and the press operation or only the pressurizing operation, depending upon the conditions.

In the method according to the present invention, it is desirable to use, as a purge gas in the regenerating process in the adsorbing tower and the dehumidifying tower, the moisture containing gas from which the organic substances which have been discharged from the respective adsorbing processes are removed, and part of the high concentration organic substances containing dry gas by heating if necessary. However, it is possible to separately use the air fed from the outside of the system.

In the method according to the present invention, molecular sieve zeolites that adsorb only the moisture having a small molecule size such as K-A, Na-A are used as the moisture selective adsorbent used in the dehumidifying tower. Also, it is preferable to use a hydrophobic adsorbent which has a relatively low adsorbing power and which is almost free from the adverse affect of moisture, as the solvent adsorbent to be used in the adsorbing tower. More specifically, high silica zeolites, having a high silica/alumina ratio of 25 or more, such as ZSM-5, silicalite, USY, mordenite, low silica system zeolites such as Ca-X type zeolite, Na-X type zeolite, silica super fine granulated particles (for example, particles having an average particle size of 1.5 mm which have been obtained by granulating a silica super fine particle having a size of 1 µm or less), silica gel, γ-alumina, activated carbon and the like may be exemplified. Incidentally, in order to process the organic substances which is likely to be thermally decomposed, it is more preferable to use the high silica zeolites having a silica/alumina ratio of 25 or more.

In the method according to the present invention, it is sufficient to suitably determine the temperature and pressure conditions in the adsorbing tower for the organic substances and in the dehumidifying tower for the moisture depending upon the kind of organic substances to be collected, adsorbent or moisture absorbent, the condition of the off-gas, the design condition of the plant and the like. However, preferably, the relatively low temperature condition relating to the adsorbing process in the adsorbing tower for the organic substances is in the range of 10° to 50° C., the relatively high temperature condition relating to the removal process for the organic substances is in the range of 75° to 150° C., more preferably, 90° to 110° C., the relatively low temperature condition relating to the adsorbing process in the dehumidifying tower is in the range of 10° to 50° C., and the relatively high temperature condition relating to the moisture absorbent regenerating process is in the range of 75° to 150° C., more preferably, 90° to 110° C. In the case where the pressure swing method is used in the dehumidifying tower, preferably, the relatively high pressure condition relating to the adsorbing process in the dehumidifying tower is in the range of 1.02 to 1.30 atm, more preferably, in the range of 1.15 to 1.25 atm, and the relatively low pressure condition relating to the moisture absorbent regenerating process is in the range of 0.03 to 1.0 atm, more preferably in the range of 0.05 to 0.3 atm.

In the method according to the present invention, the following operations or effects may be enjoyed.

(1) It is possible to avoid the decomposition of the organic substances and the decomposition of the adsorbent by adopting the temperature swing method for adsorbing the organic substances at the relatively low temperature and desorbing the organic substances at the relatively high temperature by using the zeolite having the high $SiO_2/Al_2O_3$ ratio as the adsorbent for the organic substances.

(2) By selectively removing the moisture from the system including the organic substances and the moisture, condensed water which would be formed by the conventional low temperature condensation is not produced and it is possible to avoid secondary contamination such as water pollution due to the organic substances to the condensed water.

(3) Since the gas containing high concentration organic substances to be collected from the regenerating process for the moisture absorbent is subjected to dehumidification to such an extent that the moisture dew point is below −30° C., the liquefaction of the organic substances may be effectively carried out.

DESCRIPTION OF THE PREFERRED EMBODIMENTS

A method according to the present invention will now be described on the basis of the following embodiments.

<Embodiment 1>

Figure 1:
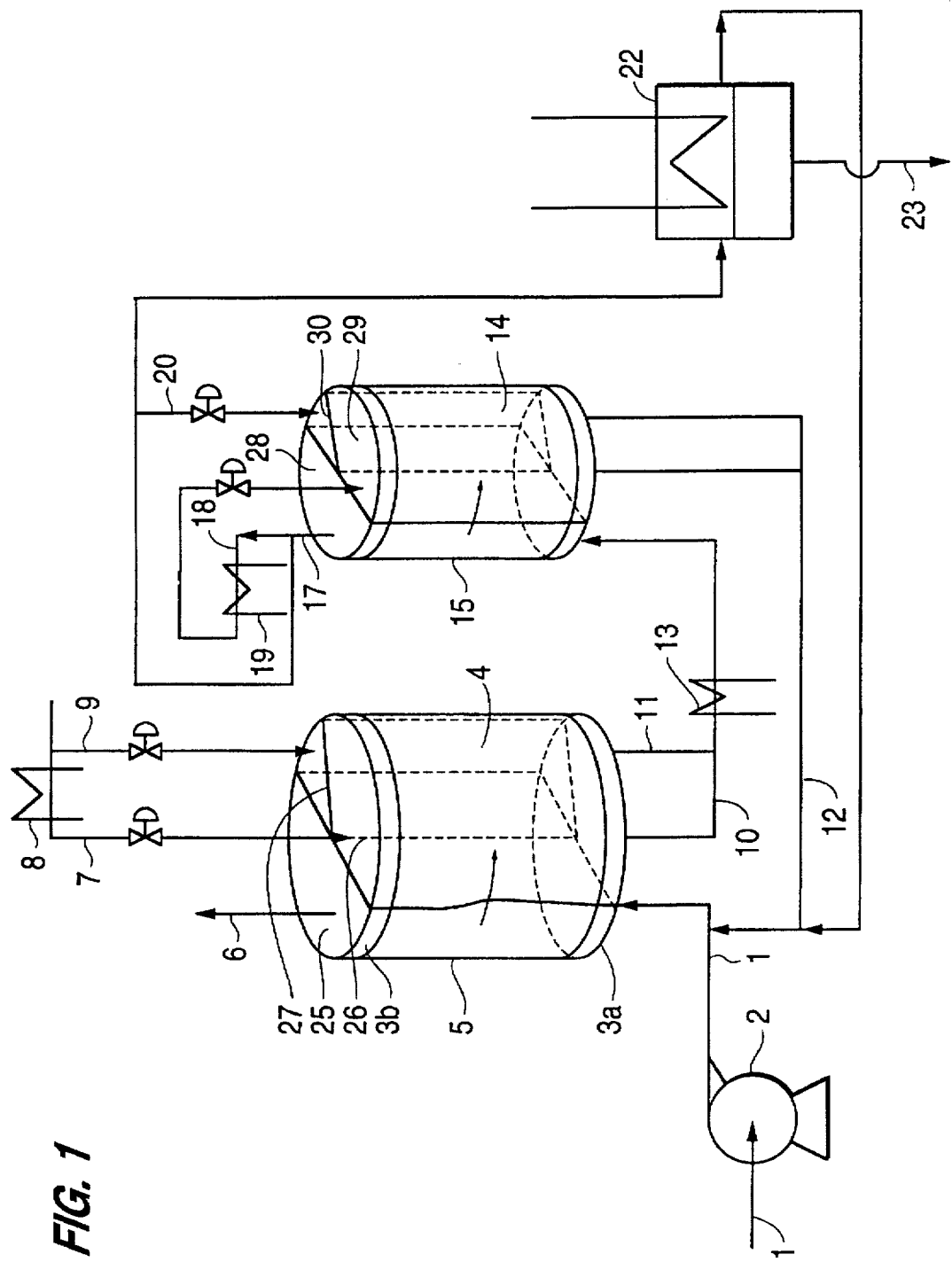
FIG. 1 is a schematic diagram showing a flow according to one embodiment of the invention.

FIG. 1 is a schematic view showing a system illustrating an example of an apparatus for embodying the method according to the present invention. An organic substances collecting test from off-gas discharged from a plant, including cyclohexanone of 1,000 ppm, MEK of 1,000 ppm, and toluene of 1,000 ppm as organic substances and further including moisture of 2 vol. % using the apparatus shown in Fig. 1 was conducted.

In FIG. 1, an adsorbing tower 5 was in the form of a cylinder and was filled with a honeycomb structure, as an adsorbent 4, carrying a zeolite USY having a $SiO_2/Al_2O_3$ ratio of 70 for selectively adsorbing only the organic substances from a system containing the organic substances and the moisture. The adsorbing tower 5 was divided into three regions 25, 26 and 27 for performing an adsorbing process, a regenerating process and a cooling process, respectively, at a lower valve plate 3a and an upper valve plate 3b. This dehumidifying tower was rotated through one turn once an hour for repeatedly performing the adsorbing process, the regenerating process and the cooling process in this order.

The off-gas (whose temperature is 25° C. and whose flow amount is 1,000 $Nm^3/h$), having the above-described composition, fed from a flow path 1 is compressed to about 200 to 500 mmaq by a blower 2, and is fed to the adsorbing process region 25 of the adsorbing tower 5. The organic substances is gradually adsorbed at the temperature of 25° C. so that the organic substances are removed to the extent that it is 100 ppm in total from an outlet of the adsorbing tower 5. The resulting non-harmful, moisture containing gas 6 in which the moisture amount is kept substantially unchanged and the organic substances have been removed is caused to flow to the outside of the system.

Adsorbent 4 which has adsorbed the organic substances in the adsorbing process region 25 of the adsorbing tower 5 is introduced into the regenerating process region 26 by the rotation of the adsorbing tower 5. A purge gas 7 which is the air fed from the outside of the system and is heated by a heater 8 is caused to flow in the counter direction to the adsorbing process to thereby desorb the organic substances and to perform the regeneration. It is possible to use, as the purge gas 7, the resulting non-harmful moisture containing gas 6 discharged out of the outlet of the adsorbing tower 5.

The adsorbent 4 which has passed through the regenerating process region 26 is introduced into the subsequent cooling process region 27 and is cooled by a cooling gas 9 kept at a room temperature and having the same composition as that of the purge gas 7, so that the subsequent adsorbing process may be smoothly performed.

A separate gas 10 which is discharged through the adsorbent regenerating process and which contains the organic substances that has been reduced in volume and condensed approximately three to twenty times is merged into a flow-by gas 11 in the cooling process and is cooled down to the room temperature by a cooler 13. The desorbed gas 10 is fed to an adsorbing process region 28 of a dehumidifying tower 15 having a similar structure to the adsorbing tower 5. A honeycomb assembly of a silica system fiber carrying Na-A type zeolite as a moisture absorbent 14 is filled in the dehumidifying tower 15. The moisture contained in the gas fed to the dehumidifying tower 15 is gradually adsorbed from the inlet of the dehumidifying tower. A high concentration organic substances containing dry gas 17 containing the organic substances about 2 vol % and dehumidified at −65° C. below a dew point is discharged from the outlet of the dehumidifying tower 15.

The moisture absorbent 14 which has adsorbed the moisture at the room temperature in the adsorbing process region 28 is introduced into the regenerating process region 29 by the rotation of the dehumidifying tower 15. Part of the high concentration organic substances containing dry gas 17 fed out from the adsorbing process region 28 is heated up to 110° C. as the purge gas 18 by a heater 19 and is caused to flow in the counter direction to the adsorbing process for regeneration. The more the purge gas 18 to be used in the regenerating process, the lower the regeneration temperature will become. However, since the organic substances which have been collected once should be used, the amount of the purge gas should be kept equal to or less than 30% of the high concentration organic substances containing dry gas 17. If not, the economic problem would be posed.

The moisture absorbent 14 which has passed through the regenerating process region 29 is introduced into the subsequent cooling process region 30 and is cooled down to the room temperature by a cooling gas 20 using part of the above-described high concentration organic substances containing dry gas 17, so that the subsequent adsorbing process may be smoothly performed. The gas to be discharged from the regenerating process region 29 and the cooling process region 30 of the dehumidifying tower 15 is merged and mixed into the off-gas to be fed to the adsorbing tower 5 as the organic substances containing wet gas 12.

The organic substances containing gas (high concentration organic substances containing dry gas 17) which has been reduced in volume and condensed about three to twenty times in the adsorbing tower 5 and has been dehumidified at about −65° C. below the dew point in the dehumidifying tower 15 is introduced into a low temperature liquefier 22 at a temperature of −30° C. As a result, toluene, MEK, cyclohexanone are condensed and collected as the liquefied collection organic substances 23. The non-condensed gas which has not been condensed in the low temperature liquefier 22 is recirculated into the supply gas to be fed to the adsorbing tower 5 through the liquefier With such an arrangement, the organic substances are kept in a closed cycle between the adsorbing tower 5 and the low temperature liquefier 22. Accordingly, if a layer height of the adsorbing tower 5 is sufficient so as not to cause the organic substances to flow by, the organic substances are collected in the liquefied condition when the organic substances reach a gas-liquid equilibrium concentration corresponding to a set temperature of the liquefier 22. Incidentally, the interior of the adsorbing tower 5 and the dehumidifying tower 15 is partitioned for each process region by partitioning plates. Furthermore, a suitable plurality of partitioning plates are provided in order to prevent the internal leakage in each process region, if necessary.

In the above-described apparatus, in view of the fact that the amount of adsorption to the organic substances is large, a high silica zeolite USY is used as the adsorbent 4. Instead, however, it is possible to use any other hydrophobic zeolites such as ZSM-5 and silicalite. However, since it is said that the catalytic property of the adsorbent against the thermal decomposition of MEK and cyclohexanone is caused by aluminum contained in the zeolite, if the regeneration efficiency is enhanced (enhancement of the volume reduction condensation and reduction of amount of the adsorbent) by setting the regeneration temperature to a relatively high temperature, it is desirable to use zeolite having as high a $SiO_2/Al_2O_3$ ratio as possible. However, since pentacyl zeolite such as ZSM-5 has a smaller window diameter of 6 Å than X, Y and USY zeolites of 9 to 10 Å and its adsorption rate is decreased against gas having a large molecular size such as organic substances, there are some cases where such a kind of zeolite could not be used depending upon the substance to be adsorbed.

The operational conditions of the adsorbing tower 5 were as follows: In the normal operation, the temperature of the adsorbing process was set at 25° C., the regeneration temperature was set at 110° C., the purge gas amount was set at 140 Nm³/h (about seven times in volume reduction condensation ratio), and the gas having the inlet gas amount of 1,000 Nm³/h was introduced into the adsorbing tower 5 having a volume of 0.2 m³ and was processed at a rotational speed of 3 rph, so that the total concentration of 100 ppm of the outlet gas (indicated by reference numerals 10 and 11 in FIG. 1) was maintained against the total concentration of 3,000 ppm of the organic substances in the inlet gas (i.e., the gas fed through the flow path 1 in FIG. 1). When the regeneration temperature of the adsorbing tower 5 was varied from 50° to 150° C., the concentration of the organic substances in the outlet gas was obtained as shown in FIG. 2.

Figure 2:
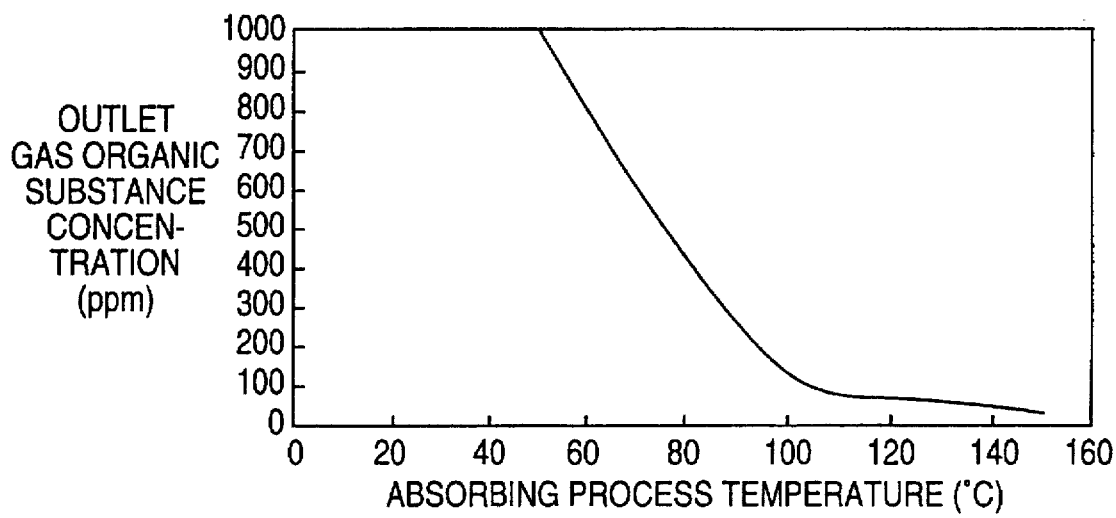
FIG. 2 is a graph showing a relationship between the temperature of a regenerating process in the adsorbing tower and the concentration of an organic substances concentration in the outlet gas.

As apparent from FIG. 2, when the regeneration temperature of the adsorbing tower 5 was equal to or less than 75° C., the concentration of the organic substances in the outlet gas exceeded 500 ppm so that it was impossible to maintain the performance of the apparatus. On the other hand, when the regeneration temperature was equal to or higher than 100° C., the concentration of the organic substances in the outlet gas was further lowered in accordance with the increase of the temperature. With respect to the separation of the organic substances, the higher the temperature of the regenerating process, the more the performance of the adsorbing tower 5 would become. However, when the temperature exceeded 110° C., the decomposition of the MEK and cyclohexanone was noticed, it was impossible to use the higher regenerating temperature depending on the kind of the organic substances. In this embodiment, the regenerating temperature was 110° C. in view of the thermal decomposition the organic substances to be removed included the MEK and cyclohexanone. In the case where the organic substances include organic substances, having a relatively thermal stability, such as methanol and isopropanol, it is possible to set the temperature to about 150° C.

In the operational conditions of the dehumidifying tower 15, in the normal operation, the temperature of the adsorbing process was set at 25° C., the regeneration temperature was set at 110° C., 25% of the outlet gas (indicated by reference numeral 17 in FIG. 1) of the dehumidifying tower 15 was used as the purge gas, and the inlet gas (indicated by reference numerals 10 and 11) having an amount of 1,000 Nm³/h was introduced into the dehydrating tower 15 having a volume of 0.25 m³ and processed at a rotational speed of 1 rph so that the moisture dew point of −65° C. of the outlet gas (indicated by reference numeral 17 in FIG. 1) was kept against the inlet moisture dew point 15° C. When the amount of the purge gas in the regenerating process of the dehydrating tower 15 was changed from 100 to 500 Nm³/h, the moisture dew point of the outlet gas was changed as shown in FIG. 3.

Figure 3:
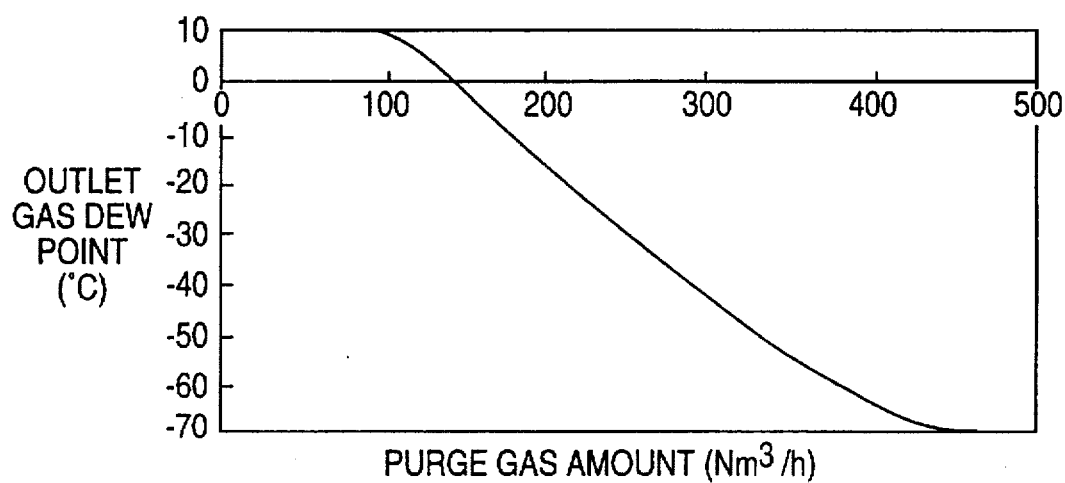
FIG. 3 is a graph showing a relationship between an amount of purge gas in the regenerating process in the dehumidifying tower and a dew point of the outlet gas of the adsorbing process.

As was apparent from FIG. 3, when the amount of the purge gas was reduced to 10% of the inlet gas amount, i.e., about 100 Nm³/h, the dew point of the outlet gas was raised to 5° C. and was insufficient for the drying of the off-gas in the apparatus. In the apparatus, that is, even if the purge rate of the off-gas was increased up to about half of the outlet gas (indicated by reference numeral 17 in FIG. 1) of the dehumidifying tower 5 and was used to carry out the regenerating purge, there was no economical problem. The outlet dew point was at −30° C. at the purge rate of 25%. It was possible to attain the dehumidification at such a high efficiency that the outlet dew point of −65° or less was regarded as a critical limit at the purge rate of 50%. Also, in this case, since the regenerating temperature was set at 110° C., in the case where the utility steam for the factory was present, the energy to be needed for dehumidification was very small.

Figure 4:
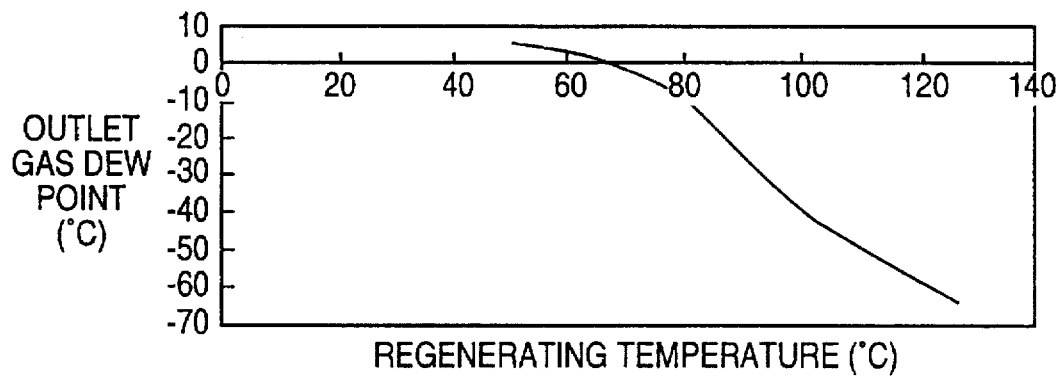
FIG. 4 is a graph showing a relationship between a regenerating temperature in the regenerating process in the dehumidifying tower and a dew point of the outlet gas in the adsorbing process.

Also, the outlet gas dew point was shown when the purge rate of 500 Nm³/h which was 50% of the off-gas was used and the regenerating temperature was changed from 50° to 150° C. As was apparent from FIG. 4, the dew point was insufficient because it was 5° C. at the regenerating temperature of 50° C. However, when the regenerating temperature was increased up to 75° C., the outlet gas dew point was at −30° C. Accordingly, this was sufficient for the drying operation of the apparatus. Thus, it was possible to attain the dehydration close to the limit of the outlet dew point of −65° C. when the regenerating temperature was raised to 110° C.

In this embodiment, it was confirmed that, first of all, the hydrophobic adsorbent such as high silica zeolite system one was used for adsorbing the organic substances, the off-gas which was made non-harmful and discharged through the adsorbing process was discharged outside the system, the organic substances containing gas reduced in volume, condensed and collected was dried in the dehumidifying unit using the moisture selective type adsorbent (moisture absorbent), and the organic substances might be collected from the dried organic substances gas under the low temperature liquefaction condition.

Also, the collected organic substances were compared with a fresh organic substances through a desorbed pattern of FTIR, NMR and a gas-chromatograph. There was no difference therebetween. It was apparent from this that it was possible to collect the organic substances while avoiding the thermal decomposition according to the present invention.

In the example, the rotary cylindrical apparatus for the method of switching the flow paths of the gas in order, as the adsorbing tower and the dehumidifying tower in the embodiment, was used. It is apparent that the apparatus for carrying out the method of the invention is not limited to such a structure. Needless to say, it is possible to change the system so that, a plurality of adsorbing towers and a plurality of dehumidifying towers are provided and the adsorbing process, regenerating process and cooling process are carried out for every tower in a switching manner in order.

<Embodiment 2>

In the first embodiment, the moisture removal is attained by processing the high concentration organic substances containing gas desorbed and collected from the organic substances containing gas through the dehumidifying tower located downstream thereof through the temperature swing method. According to the present invention, it is possible to use a dehumidifying tower which is of the pressure swing instead of the temperature swing type. A high concentration organic substances containing gas having an amount of 140 Nm$^3$/h, discharged from an adsorbing tower, with a total organic substances concentration of 2 vol.% and a moisture of 1 vol.% is desorbed under the condition of the adsorbing pressure of 1.2 ata, a regeneration pressure of 0.1 ata and a counterflow purge rate of 120% by using two dehumidifying towers each of which is filled with Na-A type zeolite as adsorbents. As a result, it is possible to reduce the moisture dew point of the organic substances containing gas below −65° C. In the comparison between the temperature swing method and the pressure swing method, the temperature swing method is superior to the pressure swing method in the case where the heat source may readily be obtained. In view of the necessity to prevent the increase of the amount of used adsorbents under the high concentration steam condition where the inlet dew point is about 30° C., the pressure swing method is recommended.

According to the present invention, also with respect to a low concentration organic substances containing gas, it is possible to collect the organic substances at a high concentration magnification ratio without degrading the organic substances and the adsorbent. In addition, since there is no fear of freezing, it is possible to effectively carry out the liquefying and condensation.

Namely, first of all, the organic substances is adsorbed and separated from the gas containing the organic substances and the moisture by the temperature wing method (which is a method for separating the component gas by utilizing the adsorption amount difference of the adsorbents due to the temperature difference). The non-harmful gas is discharged while containing the moisture. The moisture is removed from the adsorbed and separated high concentration substance containing gas by the temperature swing method or the pressure swing method. Thereafter, the gas is cooled and liquefied so that the organic substances are collected. Thus, it is possible to collect the organic substances from the gas containing both the moisture and the organic substances with a low energy and a low temperature.

Also, since the organic substances may be collected at the low temperature, the degradation of the organic substances and the adsorbent is suppressed. Furthermore, if the processing gas is used in the regenerating process of the adsorbents and moisture absorbent in the adsorbing tower or the dehumidifying tower, it is possible to form a more effective process.

What is claimed is:

1. A method for collecting volatile organic substances by processing gas containing volatile organic substances and moisture with a moisture absorbent and another absorbent, comprising the following steps:

introducing the gas containing the volatile organic substances and the moisture into an adsorbing tower filled with said another absorbent for selectively adsorbing the volatile organic substances and being in an adsorbing process under a relatively low temperature condition to remove the volatile organic substances from the gas containing the volatile organic substances and moisture, and discharging the gas as a moisture containing gas from which the volatile organic substances are removed to outside the system;

desorbing and regenerating the adsorbents which has adsorbed the volatile organic substances by a purge gas under a relatively high temperature condition in a regenerating process;

introducing the desorbed gas containing the volatile organic substances at a high concentration discharged from the adsorbent regenerating process into a dehumidifying tower filled with the moisture absorbent for selectively adsorbing the moisture and being in the adsorbing process under a relatively low temperature condition and removing the moisture therefrom;

regenerating the moisture absorbent that has absorbed the moisture by desorbing the moisture by the purge gas under a relatively high temperature condition in a regenerating process; and introducing the dry gas containing a high concentration of volatile organic substances discharged from the absorbing process in said dehumidifying tower into a liquefier and cooling and/or pressuring the dry gas to be liquefied to collect the volatile organic substances.

2. The method for collecting the volatile organic substances according to claim 1 wherein, in said absorbing tower, the outlet gas from the absorbing process of said dehumidifying tower is used as the purge gas for the regeneration of the absorbents that have absorbed the moisture.

3. A method for collecting volatile organic substances by processing gas containing volatile organic substances and moisture with a moisture absorbent and another adsorbent, comprising the following steps introducing the gas containing the volatile organic substances and the moisture into an adsorbing tower filled with said another absorbent for selectively adsorbing the volatile organic substances and being in the adsorbing process under a relatively low temperature condition to remove the volatile organic substances therefrom, and discharging the gas outside the system as a moisture containing gas from which the volatile organic substances are removed;

desorbing and regenerating said another absorbent that has adsorbed the volatile organic substances, by a purge gas under a relatively high temperature condition in a regenerating process;

introducing a desorbed gas containing the volatile organic substances at a high concentration discharged from the adsorbent regenerating process into a dehumidifying tower filled with the moisture adsorbent for selectively adsorbing the moisture and being in the adsorbing process under a relatively high pressure condition and removing the moisture therefrom;

regenerating the moisture absorbent that has adsorbed the moisture by desorbing the moisture by the purge gas under a relatively low pressure condition in a regenerating process; and introducing a dry gas containing a high concentration of volatile organic substances discharged from the adsorbing process in said dehumidifying tower into a liquefier and cooling and/or pressurizing the dry gas to be liquefied to collect the volatile organic substances.

4. The method for collecting the volatile organic substances according to claim 3, wherein, in said adsorbing tower, the outlet gas from the adsorbing process of said dehumidifying tower is used as the purge gas for the regeneration of the adsorbents that have adsorbed the moisture.

5. The method for collecting the volatile organic substances according to claim 1 or 3, wherein, in said volatile organic substances absorbing tower, an outlet gas from the absorbing process of said volatile organic substances absorbing tower is used as the purge gas for the regeneration of the absorbents that have absorbed the volatile organic substances.

6. The method for collecting the volatile organic substances according to claim 5, wherein, in said adsorbing tower, the outlet gas from the adsorbing process of said dehumidifying tower is used as the purge gas for the regeneration of the adsorbents that have adsorbed the moisture.

* * * * *